US012387669B2

(12) United States Patent
Miscuglio et al.

(10) Patent No.: US 12,387,669 B2
(45) Date of Patent: Aug. 12, 2025

(54) DISPLAY PANEL BRIGHTNESS CONTROL BASED ON GAUSSIAN EDGES

(71) Applicant: Apple Inc., Cupertino, CA (US)

(72) Inventors: Mario Miscuglio, Sunnyvale, CA (US); Yang Xu, Santa Clara, CA (US); Snehal T Jariwala, San Jose, CA (US); Yi Qiao, San Jose, CA (US); Jean-Pierre S Guillou, La Jolla, CA (US); Jenny Hu, Santa Clara, CA (US); Ming Xu, Cupertino, CA (US); Wanqing Xin, San Jose, CA (US); Zuo Xia, San Jose, CA (US); Xin Zheng, San Jose, CA (US); Jie Won Ryu, Santa Jose, CA (US); Graeme M Williams, San Diego, CA (US); Kingsuk Brahma, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/540,613

(22) Filed: Dec. 14, 2023

(65) Prior Publication Data

US 2024/0203335 A1 Jun. 20, 2024

Related U.S. Application Data

(60) Provisional application No. 63/433,250, filed on Dec. 16, 2022.

(51) Int. Cl.
*G09G 3/3208* (2016.01)

(52) U.S. Cl.
CPC ... *G09G 3/3208* (2013.01); *G09G 2320/0233* (2013.01); *G09G 2320/0686* (2013.01); *G09G 2330/021* (2013.01); *G09G 2340/00* (2013.01)

(58) Field of Classification Search
CPC ......... G09G 3/3208; G09G 2320/0233; G09G 2320/0686; G09G 2330/021; G09G 2340/00
USPC .......................................................... 345/694
See application file for complete search history.

(56) References Cited

U.S. PATENT DOCUMENTS

| | | | |
|---|---|---|---|
| 11,217,211 B2 | 1/2022 | Tang et al. | |
| 2009/0189543 A1 | 7/2009 | Yeo et al. | |
| 2016/0104438 A1* | 4/2016 | Han | G09G 3/3607 345/690 |
| 2018/0047345 A1 | 2/2018 | Dunn et al. | |
| 2018/0053290 A1* | 2/2018 | Hu | G06T 5/92 |

(Continued)

OTHER PUBLICATIONS

Zhang, J. et al., "An Adaptive Tone Mapping Algorithm for High Dynamic Range Images," Comptational Color Imaging, 2009, 9 pages.

(Continued)

*Primary Examiner* — Tom V Sheng
(74) *Attorney, Agent, or Firm* — Fletcher Yoder, P.C.

(57) ABSTRACT

Systems and methods described herein may utilize a non-linear scaling relationship to scale brightness of selective portions of the display in a manner that reduces or eliminates perceivable banding effects. By non-linearly controlling changes in brightness of the display, a viewer may perceive a more uniform, linear dimming towards the relatively dimmer region without perceiving banding, leading to improved user experience when viewing the electronic display.

20 Claims, 13 Drawing Sheets

(56) References Cited

U.S. PATENT DOCUMENTS

| | | | | |
|---|---|---|---|---|
| 2019/0073756 | A1* | 3/2019 | Stessen | G06T 5/20 |
| 2020/0005710 | A1* | 1/2020 | Miyata | G09G 3/3233 |
| 2020/0243025 | A1 | 7/2020 | Xi et al. | |
| 2020/0402477 | A1* | 12/2020 | Jiang | G06F 3/013 |
| 2021/0012717 | A1* | 1/2021 | Park | G09G 3/20 |
| 2021/0118382 | A1* | 4/2021 | Wu | G09G 3/3614 |
| 2021/0193047 | A1* | 6/2021 | Kwon | G09G 3/3258 |
| 2021/0225242 | A1* | 7/2021 | Lee | G09G 3/20 |
| 2021/0335273 | A1* | 10/2021 | Meng | G09G 3/3275 |
| 2022/0334421 | A1* | 10/2022 | Maruoka | G02F 1/133611 |
| 2022/0335907 | A1* | 10/2022 | Shi | G09G 3/3426 |
| 2024/0062731 | A1* | 2/2024 | Sung | G09G 3/3208 |

OTHER PUBLICATIONS

Wallis et al., "Mach bands and multiscale models of spatial vision: The role of first, second and third derivative operators in encoding bars and edges," Journal of Vision, Dec. 21, 2012, 25 pages.

* cited by examiner

DISPLAY PANEL BRIGHTNESS CONTROL BASED ON GAUSSIAN EDGES

CROSS-REFERENCE TO RELATED APPLICATIONS

This application claims priority to U.S. Application No. 63/433,250, entitled "DISPLAY PANEL BRIGHTNESS CONTROL BASED ON GAUSSIAN EDGES," filed Dec. 16, 2022, which is hereby incorporated by reference in its entirety for all purposes.

SUMMARY

This disclosure relates to systems and methods for controlling brightness of different regions of an electronic display based on a generalized Gaussian edge gradient.

A summary of certain embodiments disclosed herein is set forth below. It should be understood that these aspects are presented to provide the reader with a brief summary of these certain embodiments and that these aspects are not intended to limit the scope of this disclosure.

This disclosure relates to systems and methods to control brightness on an electronic display to enable selective brightness control for different portions of the electronic display without banding, a type of perceivable visual artifacts arising from how a human eye views certain patterns of brightness changes and how neurologically the pattern changes are interpreted by a viewer. Electronic displays are found in numerous electronic devices, from mobile phones to computers, televisions, automobile dashboards, and many more. Electronic displays with self-emissive display pixels produce their own light. Self-emissive display pixels may include and suitable light-emissive elements, including light-emitting diodes (LEDs) such as organic light-emitting diodes (OLEDs) or micro-light-emitting diodes (μLEDs).

Electronic displays may be driven to emit light scaled to a global brightness value, sometimes referred to as a display brightness value (DBV). The global brightness value may be changed to control an overall brightness of the electronic display. For example, the global brightness value may change when ambient light of the environment gets brighter or darker so that the brightness of the electronic display may be viewed comfortably as the ambient light changes. The global brightness value may also affect the total current transmitted through the display and, thus, power consumed by the electronic device. Sometimes, regions of the electronic display may have different behavior characteristics that affect the maximum brightness of each region. For example, one region may have a greater pixel density than another region and/or one region may have pixels with different maximum brightness capabilities than another region. This could result in some regions being relatively dimmer in appearance than other regions of the electronic display. This may occur, for example, when pixel density is variable throughout the active area of the electronic display and/or when some regions of the electronic display are intentionally driven to a dimmer brightness value (e.g., 70% brightness vs. 100% brightness).

When a portion of the electronic display is dimmed, a banding effect could be perceived between different regions of the electronic display with different brightness characteristics or capabilities (e.g., maximum brightness). Banding causes light or dark bands to be perceived at relatively abrupt changes of brightness scaling gradient in the absence of peaks or troughs in brightness. To improve continuity of the dimmed region(s) with the rest of the display panel, the dimmed region(s) and/or one or more regions of the display panel approaching the dimmed region(s) may be dimmed according to a scaling gradient. Changing brightness of different portions of the display panel based on the scaling gradient may ensure that by the time an eye of a viewer has approached the dimmed region, it has been following a brightness pattern emitted via the display panel that eliminates banding or other neurological effects. Thus, by using a brightness scaling gradient that avoids relatively abrupt changes in brightness of the presented colored images, the perceivable banding may be eliminated and the resulting presented image frame may be perceived as more uniform in appearance.

A brightness scaling gradient that is infinitely derivable may be desired as the brightness scaling gradient that avoids relatively abrupt changes in brightness. One example of such a brightness scaling gradient is based on Gaussian edges in a step function.

Accordingly, to reduce or eliminate visual artifacts resulting from the banding effect, one or more regions of a display panel may be dimmed based on Gaussian relationship. Indeed, adjusting brightness based on a Gaussian relationship may be perceived by a viewer as linearly changing brightness despite the actual peak-to-peak changes in brightness between pixels following a non-linear pattern, as will be appreciated.

In some systems, the region to be dimmed may be gradually dimmed as approaching the center of the region to be dimmed but the gradual dimming may occur in a non-linear relationship. Furthermore, in some systems, the relatively dimmer regions of the electronic display may correspond to a portion of the display panel that has a lower density of pixels, which may be desired for operating sensors behind or in front of a region of the active area. Indeed, one or more optical sensors may be disposed behind the display panel to sense light that passes through an external surface of the electronic device as well as light transmissive material implemented in the display panel. These regions may be perceived as being dimmer due to the fewer number of pixels emitting a same amount of light as another region with a greater density of pixels. Similar Gaussian relationships may be used to scale brightness associated with these regions to avoid or negate the banding effect with these variably dense pixel regions as well. In some cases, the dimming profile is scaled based on a peak brightness, which may correspond to one or more maximum pixel values corresponding to one or more portions of the display panel (e.g., a local maximum pixel value). In some cases where a maximum pixel value (e.g., peak pixel value) is lower than a peak brightness threshold, the dimming profile may be scaled using a relatively smaller scaling value (as compared to scaling when greater than the threshold), such as a value closer to 1.

For high dynamic range (HDR) image content, pixels within a dimmed region may have highlights reduced according to tone mapping based on a generalized gaussian edge profile and mid-tones and/or low grays are boosted to match a reference white of the rest of the display. This processing may effectively reduce a high dynamic range (HDR) headroom while maintaining a standard dynamic range (SDR) of the image content.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of the present disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "including" and "having" are intended to be inclusive and mean that there may be additional elements other than the listed elements. Additionally, it should be understood that references to "some embodiments," "embodiments," "one embodiment," or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

Systems and methods described herein include a display panel with an active area that has at least two portions operated to emit light at different brightness. To reduce a likelihood or avoid perceivable banding visual artifacts, the systems and methods described herein may aid in gradually implementing brightness changes through adjusting image data based on a non-linear scaling relationship that is infinitely derivable, such as a Gaussian scaling relationship.

Figure 1:
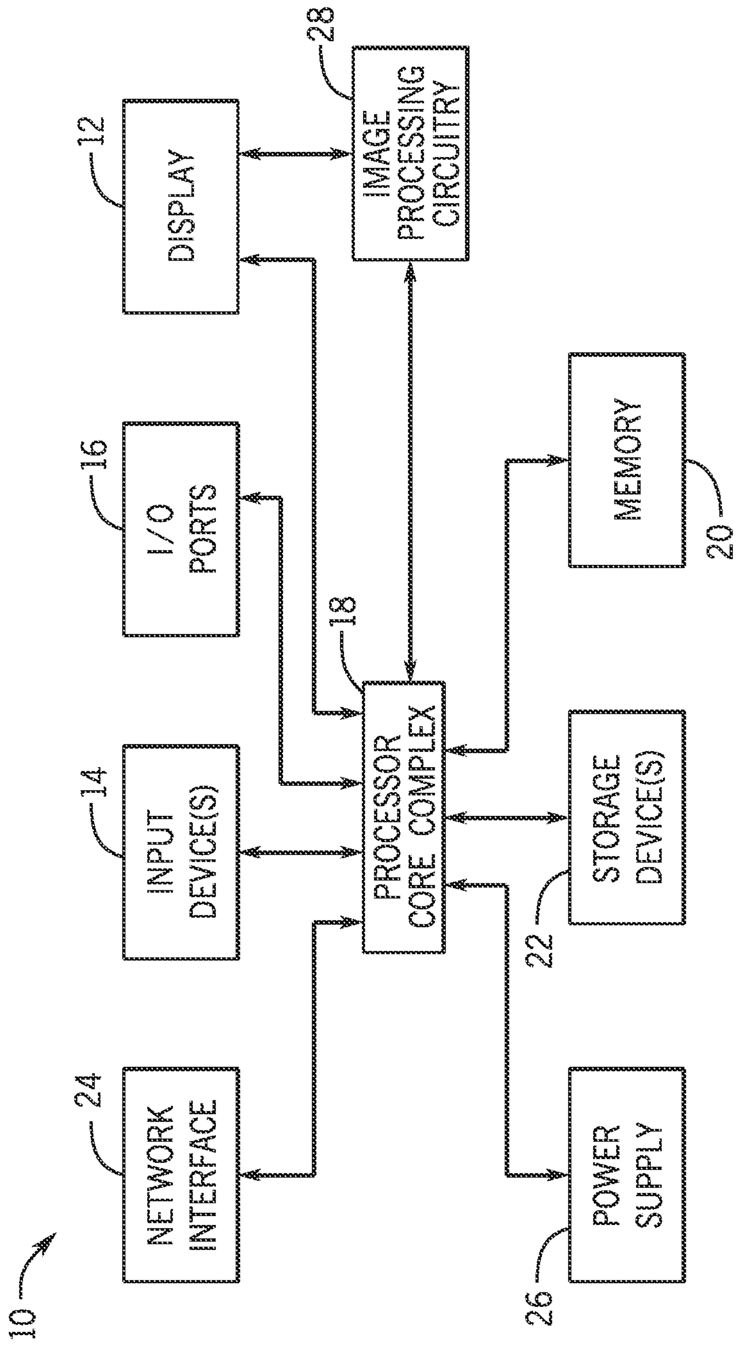
FIG. 1 is a block diagram of an electronic device including an electronic display, in accordance with an embodiment of the present disclosure.

To help illustrate, an example of an electronic device 10, which includes and/or utilizes an electronic display 12, is shown in FIG. 1. As will be described in more detail below, the electronic device 10 may be any suitable electronic device, such as a computer, a mobile (e.g., portable) phone, a portable media device, a tablet device, a television, a handheld game platform, a personal data organizer, a virtual-reality headset, a mixed-reality headset, a vehicle dashboard, and/or the like. Thus, it should be noted that FIG. 1 is merely one example of a particular implementation and is intended to illustrate the types of components that may be present in an electronic device 10.

In addition to the electronic display 12, as depicted, the electronic device 10 includes one or more input devices 14, one or more input/output (I/O) ports 16, a processor core complex 18 having one or more processors or processor cores, main memory 20, one or more storage devices 22, a network interface 24, a power supply 26, and image processing circuitry 28. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the main memory 20 and a storage device 22 may be included in a single component. The image processing circuitry 28 may be included in the processor core complex 18 or the electronic display 12.

As depicted, the processor core complex 18 is operably coupled with main memory 20 and the storage device 22. As such, in some embodiments, the processor core complex 18 may execute instructions stored in main memory 20 and/or a storage device 22 to perform operations, such as generating image data. Additionally, the processor core complex 18 may operate based on circuit connections formed therein. As such, in some embodiments, the processor core complex 18 may include one or more general purpose microprocessors, one or more application specific processors (ASICs), one or more field programmable logic arrays (FPGAs), or any combination thereof.

In addition to instructions, in some embodiments, the main memory 20 and/or the storage device 22 may store data, such as image data. Thus, in some embodiments, the main memory 20 and/or the storage device 22 may include one or more tangible, non-transitory, computer-readable media that store instructions executable by processing circuitry, such as the processor core complex 18 and/or the image processing circuitry 28, and/or data to be processed by the processing circuitry. For example, the main memory 20 may include random access memory (RAM) and the storage device 22 may include read only memory (ROM), rewritable non-volatile memory, such as flash memory, hard drives, optical discs, and/or the like.

As depicted, the processor core complex 18 is also operably coupled with the network interface 24. In some embodiments, the network interface 24 may enable the electronic device 10 to communicate with a communication network and/or another electronic device 10. For example, the network interface 24 may connect the electronic device 10 to a personal area network (PAN), such as a Bluetooth network, a local area network (LAN), such as an 802.11x Wi-Fi network, and/or a wide area network (WAN), such as a 4G or LTE cellular network. In other words, in some embodiments, the network interface 24 may enable the electronic device 10 to transmit data (e.g., image data) to a communication network and/or receive data from the communication network.

Additionally, as depicted, the processor core complex 18 is operably coupled to the power supply 26. In some embodiments, the power supply 26 may provide electrical power to operate the processor core complex 18 and/or other components in the electronic device 10, for example, via one or more power supply rails. Thus, the power supply 26 may include any suitable source of electrical power, such as a rechargeable lithium polymer (Li-poly) battery and/or an alternating current (AC) power converter.

Furthermore, as depicted, the processor core complex 18 is operably coupled with one or more I/O ports 16. In some embodiments, the I/O ports 16 may enable the electronic device 10 to interface with another electronic device 10. For example, a portable storage device may be connected to an I/O port 16, thereby enabling the electronic device 10 to communicate data, such as image data, with the portable storage device.

As depicted, the processor core complex 18 is also operably coupled with one or more input devices 14. In some embodiments, an input device 14 may enable a user to interact with the electronic device 10. For example, the input devices 14 may include one or more buttons, one or more keyboards, one or more mice, one or more trackpads, and/or the like. In some embodiments, the input devices 14 may include touch sensing components implemented in the electronic display 12. In such embodiments, the touch sensing components may receive user inputs by detecting occurrence and/or position of an object contacting the display surface of the electronic display 12.

In addition to enabling user inputs, the electronic display 12 may facilitate providing visual representations of information by displaying one or more images (e.g., image frames or pictures). For example, the electronic display 12 may display a graphical user interface (GUI) of an operating system, an application interface, text, a still image, or video content. To facilitate displaying images, as will be described in more detail below, the electronic display 12 may include a display panel with one or more display pixels.

As described above, an electronic display 12 may display an image by controlling brightness of its display pixels based at least in part on image data associated with corresponding image pixels (e.g., points) in the image. In some embodiments, image data may be generated by an image source, such as the processor core complex 18, a graphics processing unit (GPU), and/or an image sensor. In some systems, image data may be received from another electronic device 10, for example, via the network interface 24 and/or an I/O port 16. In any case, as described above, the electronic device 10 may be any suitable electronic device.

Figure 2:
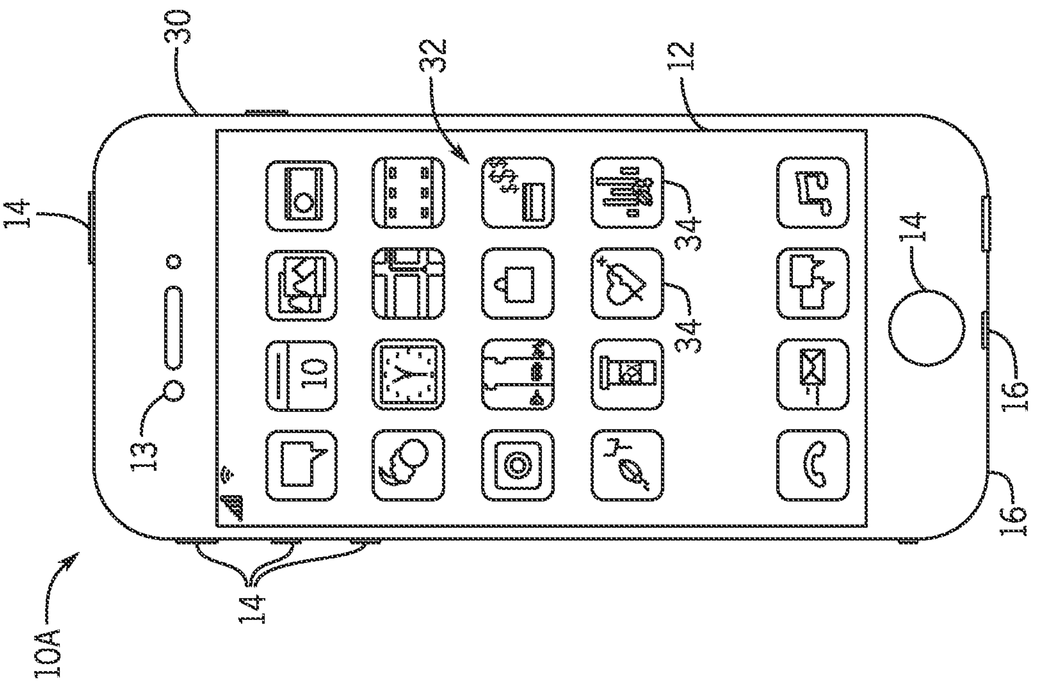
FIG. 2 is an example of the electronic device of FIG. 1, in accordance with an embodiment of the present disclosure.

To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any iPhone® model available from Apple Inc.

As depicted, the handheld device 10A includes an enclosure 30 (e.g., housing). In some embodiments, the enclosure 30 may protect interior components from physical damage and/or shield them from electromagnetic interference. Additionally, as depicted, the enclosure 30 surrounds the electronic display 12. In the depicted embodiment, the electronic display 12 is displaying a graphical user interface (GUI) 32 having an array of icons 34. By way of example, when an icon 34 is selected either by an input device 14 or a touch sensing component of the electronic display 12, an application program may launch.

Furthermore, as depicted, input devices 14 open through the enclosure 30. As described above, the input devices 14 may enable a user to interact with the handheld device 10A.

For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 16 also open through the enclosure 30. In some embodiments, the I/O ports 16 may include, for example, an audio jack to connect to external devices.

Figure 3:
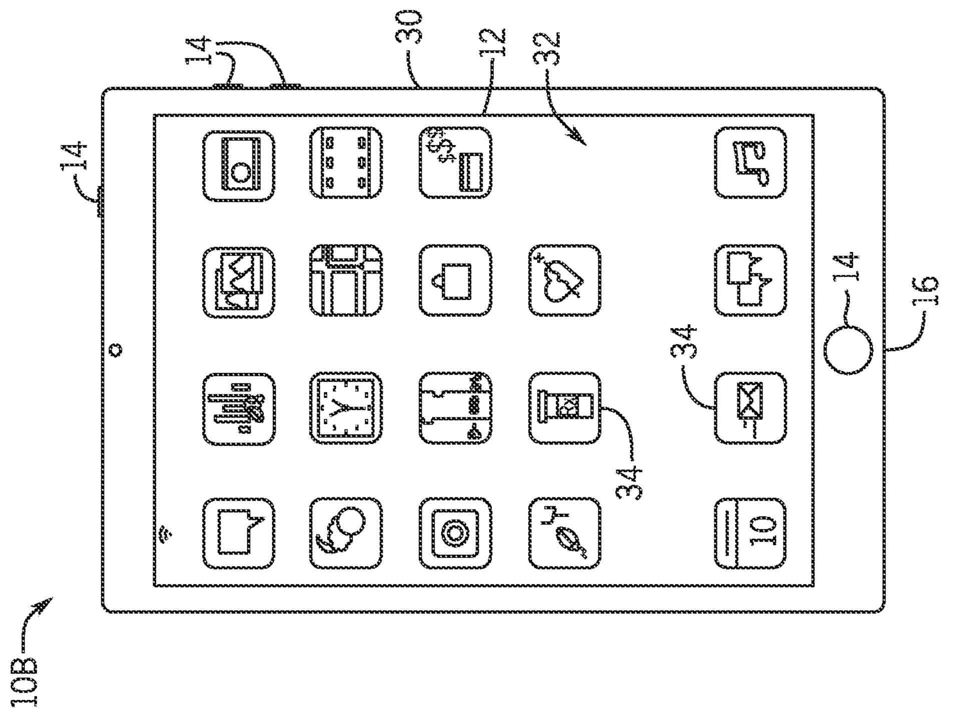
FIG. 3 is another example of the electronic device of FIG. 1, in accordance with an embodiment of the present disclosure.
Figure 4:
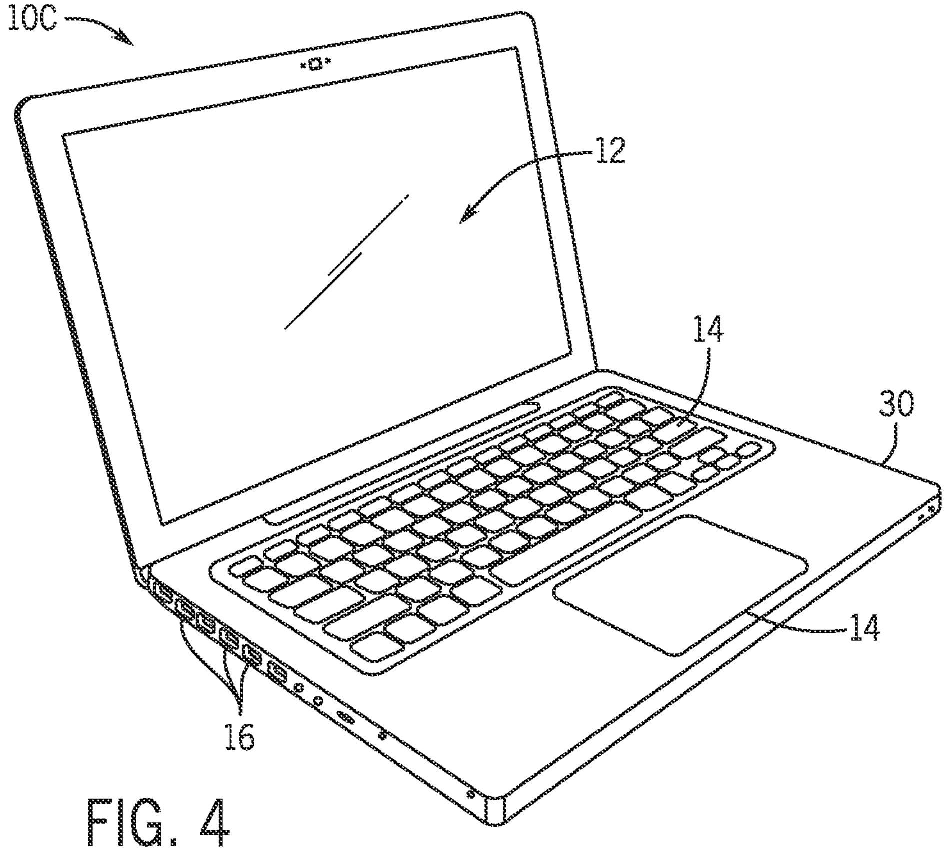
FIG. 4 is another example of the electronic device of FIG. 1, in accordance with an embodiment of the present disclosure.
Figure 5:
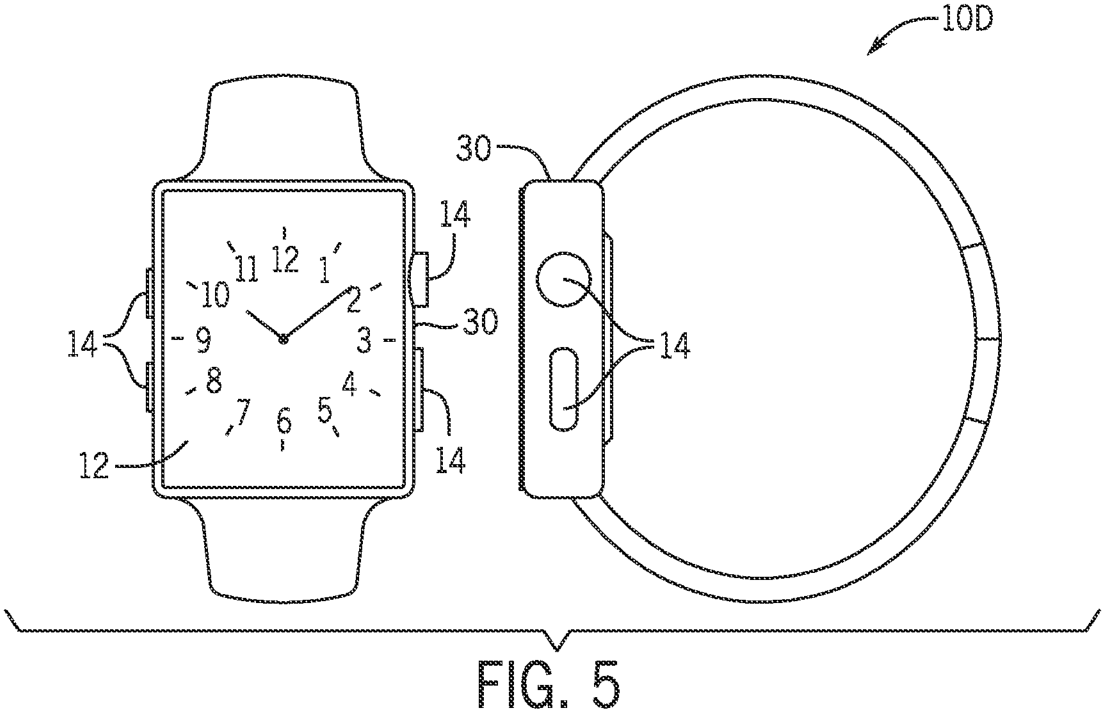
FIG. 5 is another example of the electronic device of FIG. 1, in accordance with an embodiment of the present disclosure.

To help further illustrate, another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 30. In any case, as described above, an electronic display 12 may generally display images based at least in part on image data, for example, output from the processor core complex 18 and/or the image processing circuitry 28.

Figure 6:
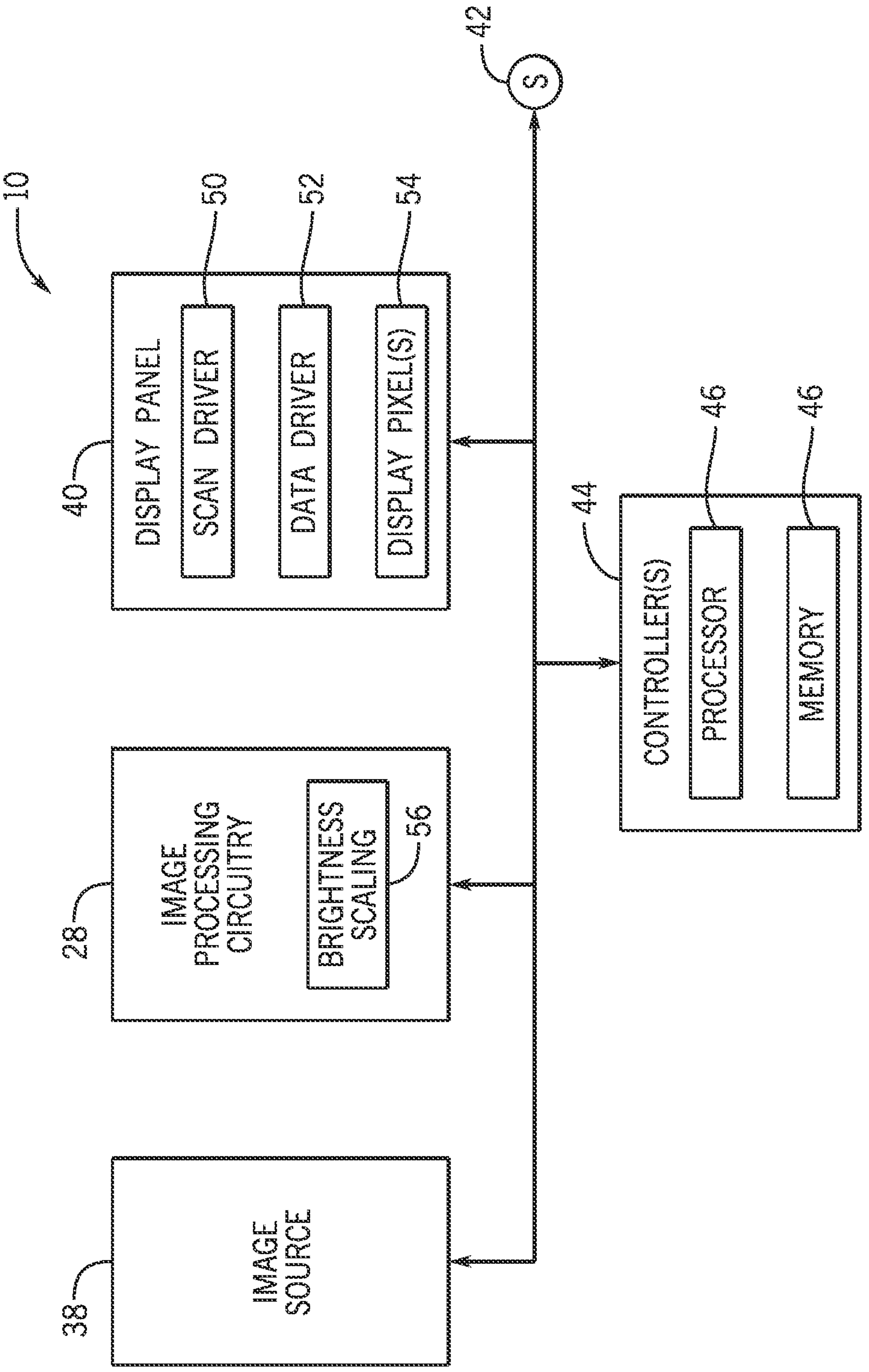
FIG. 6 is a block diagram of an example portion of the electronic display of FIG. 1 including image processing circuitry and a display panel, in accordance with an embodiment of the present disclosure.

To help illustrate, an example of a portion of an electronic device 10, which includes an image source 38 and a display panel 40 of an electronic display 12, is shown in FIG. 6. Generally, the image source 38 may be implemented and/or operated to generate source image data corresponding with an image to be displayed on the display panel 40. Thus, in some embodiments, the image source 38 may be a processor core complex 18, a graphics processing unit (GPU), an image sensor (e.g., camera), and/or the like.

To facilitate displaying images, as in the depicted example, the display panel 40 may include one or more display pixels 54 and driver circuitry, which includes a scan driver 50 and a data driver 52. In some embodiments, each display pixel 54 may emit light of a specific color component, such as a red color component, a blue color component, or a green color component. In other words, as used herein, a "display pixel" may refer to a color component sub-pixel, such as a red sub-pixel that emits red light, a blue sub-pixel that emits blue light, a green sub-pixel that emits green light, or a white sub-pixel that emits white light.

In some cases, multiple display pixels 54 (e.g., color component sub-pixels) implemented on a display panel 40 may be grouped into display pixel units. For example, the display panel 40 may include multiple display pixel units, which each includes a blue display pixel 54, a red display pixel 54, and a green display pixel 54. Each display pixel 54 may be implemented and/or operated to control light emission and, thus, perceived brightness of a specific color component. As used herein, a "display pixel" may be a color component sub-pixel, such as a red sub-pixel, a blue sub-pixel, a green sub-pixel, or a white sub-pixel. For example, the display pixel 54 may include one or more red sub-pixels, one or more blue sub-pixels, one or more green sub-pixels, one or more white sub-pixels, or any combination thereof.

Furthermore, in some embodiments, light emission from a display pixel 54 may vary with the magnitude of electrical energy stored therein. For example, in some instances, a display pixel 54 may include a light emissive element, such as an organic light-emitting diode (OLED), that varies its light emission with current flow therethrough, a current control switching device (e.g., transistor) coupled between the light emissive element and a pixel power (e.g., VDD) supply rail, and a storage capacitor coupled to a control (e.g., gate) terminal of the current control switching device. As such, varying the amount of energy stored in the storage capacitor may vary voltage applied to the control terminal of the current control switching device and, thus, magnitude of electrical current supplied from the pixel power supply rail to the light emissive element of the display pixel 54.

However, it should be appreciated that discussion with regard to OLED display pixels 54, OLED display panels 40, and OLED electronic displays 12 is merely intended to be illustrative and not limiting. In other words, the techniques described in the present disclosure may be applied to and/or adapted for other types of electronic displays 12, such as a liquid crystal display (LCD) electronic display 12 and/or a micro light-emitting diode (LED) electronic display 12. In any case, since light emission from a display pixel 54 generally varies with electrical energy storage therein, to display an image, a display panel 40 may write a display pixel 54 at least in part by supplying an analog electrical (e.g., voltage and/or current) signal to the display pixel 54, for example, to charge and/or discharge a storage capacitor implemented in the display pixel 54.

To facilitate writing an image, in some embodiments, each display pixel 54 may be coupled to the scan driver 50 via a corresponding scan line and to the data driver 52 via a corresponding data line. In particular, the scan driver 50 may be coupled to each display pixel 54 included in a row of display pixel units via a corresponding scan line. In other words, as used herein, a "display pixel row" may be a group of display pixels 54 each coupled to the same scan line. Additionally, the data driver 52 may be coupled to each display pixel 54 included in a display pixel column via a corresponding data line. In other words, as used herein, a "display pixel row" may be a group of display pixels 54 each coupled to the same data line.

In this manner, the display panel 40 may selectively write its display pixels 54. In particular, in some embodiments, the display panel 40 may successively write an image to its display pixel 54 rows. For example, to write a display pixel 54 row, the scan driver 50 may output an activation (e.g., logic high) control signal to a corresponding scan line that causes each display pixel 54 coupled to the scan line to electrically couple its storage capacitor to a corresponding data line. Additionally, the data driver 52 may output an analog electrical signal to each data line coupled to an activated display pixel 54 to control an amount of electrical energy stored in the display pixel 54 and, thus, resulting light emission (e.g., perceived brightness).

As described above, image data corresponding with a display pixel 54 on a display panel 40 may be indicative of its target brightness, for example, by indicating a target grayscale value (e.g., level) that is scaled (e.g., mapped) to a panel brightness setting. In other words, to display an image, the display panel 40 may control supply (e.g., magnitude and/or duration) of analog electrical signals from its data driver 52 to its display pixels 54 based at least in part on corresponding image data. To facilitate improving perceived image quality, as in the depicted example, the portion of the electronic device 10 may include image processing circuitry 28 coupled between the image source 38 and the display panel 40.

In particular, the image processing circuitry 28 may be implemented and/or operated to process image data output from the image source 38 before the image data is used to display a corresponding image on the display panel 40.

Thus, in some embodiments, the image processing circuitry 28 may be included in the processor core complex 18, a display pipeline (e.g., chip or integrated circuit device), a timing controller (TCON) in the electronic display 12, or any combination thereof. The image processing circuitry 28 may be implemented as a system-on-chip (SoC).

In other words, the image processing circuitry 28 may be implemented and/or operated to process source image data output from the image source 38. In some embodiments, the image processing circuitry 28 may directly receive the source image data from the image source 38. The source image data output from the image source 38 may be stored in a tangible, non-transitory, computer-readable medium, such as main memory 20, and, thus, the image processing circuitry 28 may receive (e.g., retrieve) the source image data from the tangible, non-transitory, computer-readable medium, for example, via a direct memory access (DMA) technique.

The image processing circuitry 28 may then process the source image data to generate display image data, for example, which adjusts target brightness to compensate for pixel resolution implemented on the display panel 40, ambient lighting conditions, pixel (e.g., sub-pixel) layout of the display panel 40, burn-in on the display panel 40, expected response of the display panel 40, or any combination thereof. The display (e.g., processed) image data may then be supplied (e.g., output) to the display panel 40 to enable display panel 40 to display a corresponding image based at least in part on the display image data. Due to the processing (e.g., compensation) performed by the image processing circuitry 28, at least in some instances, displaying an image based on corresponding display image data may facilitate improving perceived image quality, for example, compared to displaying the image directly using corresponding source image data.

In some embodiments, the image processing circuitry 28 may be organized into one or more image processing blocks (e.g., circuitry groups). For example, the image processing circuitry 28 may include a brightness scaling block 56 implemented and/or operated to process input image data to compensate for pixel resolution around a corresponding display pixel 54. As will be described in more detail below, to facilitate compensating for banding effects, in some embodiments, the brightness scaling block 56 may read and apply a Gaussian scaling relationship to incoming image data prior to the image processing circuitry 28 outputting the image data to the display panel 40. In some embodiments, the image processing circuitry 28 may additionally or alternatively include an ambient adaptive pixel (AAP) block, a dynamic pixel backlight (DPB) block, a white point correction (WPC) block, a sub-pixel layout compensation (SPLC) block, a burn-in compensation (BIC) block, a panel response correction (PRC) block, a dithering block, a sub-pixel uniformity compensation (SPUC) block, a content frame dependent duration (CDFD) block, an ambient light sensing (ALS) block, or any combination thereof.

Moreover, as in the depicted example, the portion of the electronic device 10 may include a controller 44 (e.g., control circuitry and/or control logic) and one or more sensors 42, such as a temperature sensor 42, a movement (e.g., accelerometer and/or gyroscope) sensor 42, and/or an optical (e.g., light) sensor 42. In some embodiments, the controller 44 may receive sensor data, such as image data, output from a sensor 42, such as an optical sensor 42 (e.g., camera, image sensor). The optical sensor 42 may be implemented and/or operated to capture an image at least in part by generating (e.g., outputting) image data, which provides a digital representation of the image, based at least in part on sensed light. In particular, the optical sensor 42 may capture an image by generating image data that indicates color and/or brightness of light sensed at various points (e.g., image pixels) in the image.

The controller 44 may generally control operation of the image source 38, the image processing circuitry 28, the one or more sensors 42, the display panel 40, or any combination thereof. Although depicted as a single controller 44, in other embodiments, one or more separate controllers 44 may be used to control operation of the image source 38, the image processing circuitry 28, the display panel 40, or any combination thereof.

To facilitate controlling operation, as in the depicted example, the controller 44 may include a controller processor 46 and controller memory 48. In some embodiments, the controller processor 46 may be included in the processor core complex 18 and/or separate processing circuitry and the controller memory 48 may be included in main memory 20, a storage device 22, and/or a separate, tangible, non-transitory computer-readable medium. In some embodiments, the controller processor 46 may execute instructions and/or process data stored in the controller memory 48 to control operation of the image source 38, the image processing circuitry 28, the display panel 40, and/or the one or more sensors 42. In other embodiments, the controller processor 46 may be hardwired with instructions that, when executed, control operation of the image source 38, the image processing circuitry 28, the display panel 40, and/or the one or more sensors 42.

As described above, in some embodiments, sensors 42 implemented in an electronic device 10 may include one or more optical sensors 42. For example, an optical sensor 42 deployed in the electronic device 10 may be an ambient light sensor 42, which is implemented and/or operated to sense (e.g., measure) environmental lighting conditions. An optical sensor 42 deployed in the electronic device 10 may be an image sensor 42, such as a camera, which is implemented and/or operated to capture an image by generating (e.g., outputting) image data, which provides a digital representation of the image, based at least in part on sensed light.

Keeping the foregoing in mind, some display panels 40 may have different portions being driven at different brightness. Brightness scaling according to a Gaussian scaling relationship may eliminate perceivable banding visual artifacts.

Figure 7:
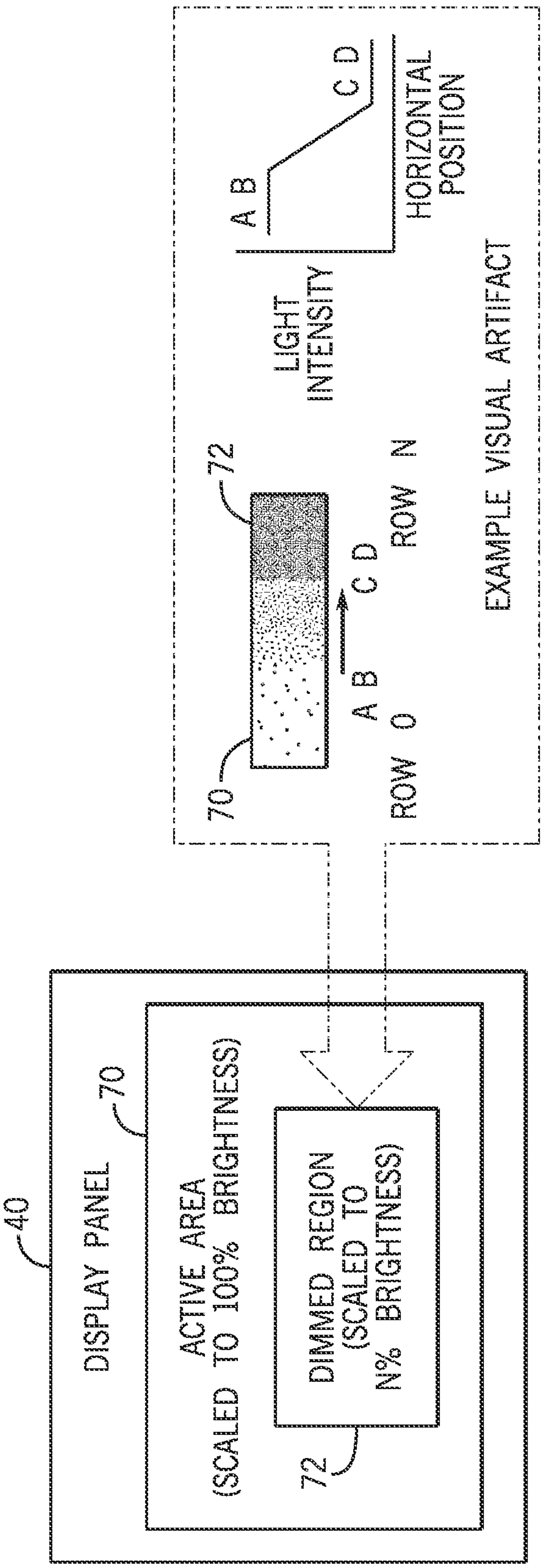
FIG. 7 is a block diagram of an example display panel of FIG. 6 that includes an active area driven at 100% brightness scaling and a dimmed region driven at N % brightness (e.g., 0% brightness . . . 50% brightness, 60% brightness, 70% brightness . . . N % brightness, any brightness less than 100% brightness) without implementing a Gaussian scaling relationship and a resulting visual artifact, in accordance with an embodiment of the present disclosure.

To help illustrate, FIG. 7 is a block diagram of an example display panel of FIG. 6 that includes an active area 70 (e.g., first region, first panel section) driven at 100% brightness scaling and a dimmed region 72 (e.g., second region, second panel section) driven at N % brightness (e.g., 70% brightness) without implementing a Gaussian scaling relationship and a resulting visual artifact. The dimmed region 72 may be configurable to be dimmed relative to the active area 70. Here, a trapezoidal brightness scaling relationship is used to step down the brightness of the dimmed region 72 to N % from the 100% brightness of the active area 70. Points A and B correspond to 100% brightness scaling while points C and D correspond to N % (e.g., 70% brightness scaling). Banding may be present at points B and C as opposed to a blended, gradual brightness change. This obvious change in brightness at points B and C may be considered a visual artifact and may be caused by a human eye being sensitive to a first and second derivative of a brightness profile adjusted based on a trapezoidal step down. The visual artifacts from banding may be ever further exaggerated when viewing the display panel 40 from a side-angle and/or a non-perpendicular axis to the display panel. Thus, it may be desired to cure these visual artifacts to improve user experience with the display panel as well as to conserve computing resources used to compensate for and/or arising from misuse of the electronic device 10 caused by the visual artifacts.

Figure 8:
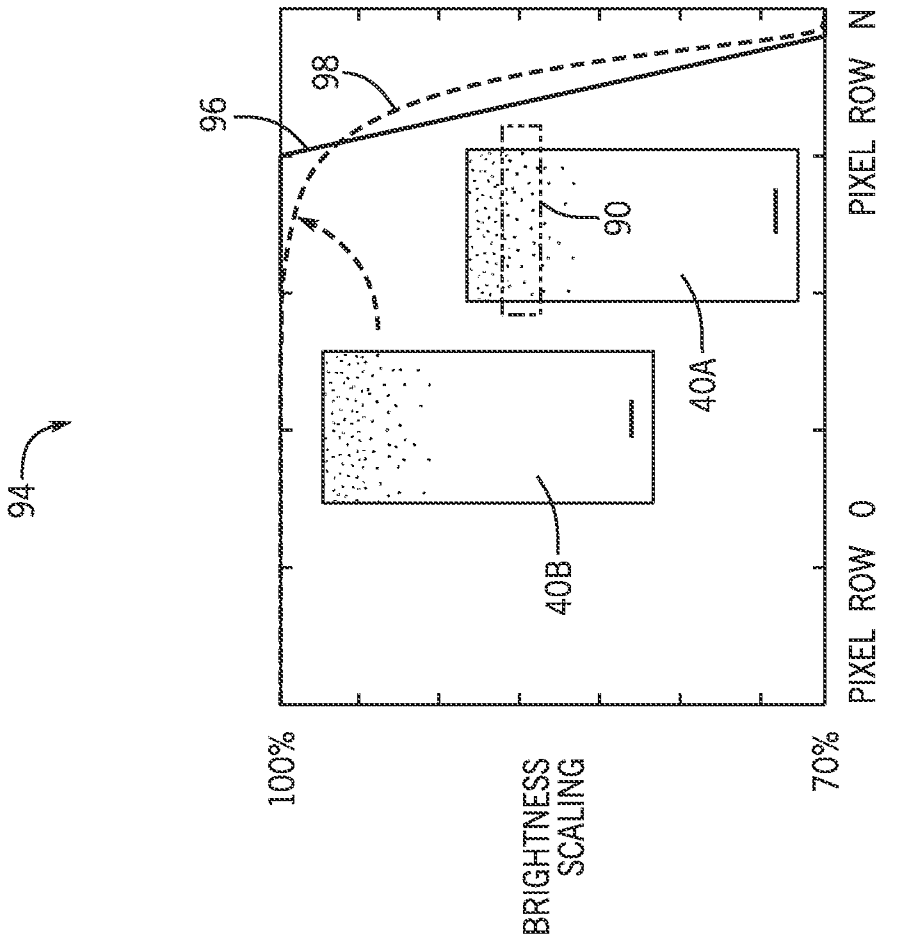
FIG. 8 is a diagrammatic representation of an example generalized Gaussian scaling relationship and an example trapezoidal scaling relationship (e.g., linear scaling relationship) over N pixel rows, where the relationships are respectively illustrated with the corresponding brightness scaling gradients for each of the relationships, in accordance with an embodiment of the present disclosure.
Figure 9:
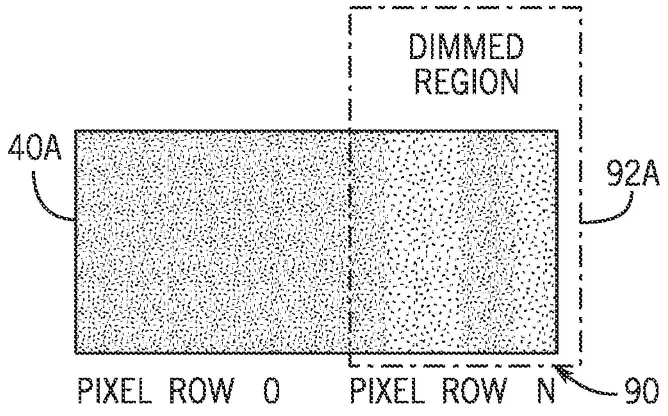
FIG. 9 is a diagrammatic representation of the display panel of FIG. 7 that implements the trapezoidal scaling relationship of FIG. 8 and a resulting visual artifact, in accordance with an embodiment of the present disclosure.
Figure 10:
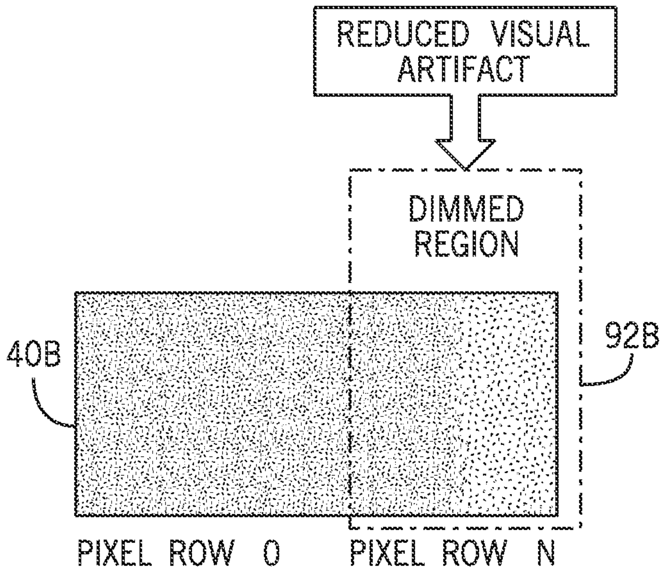
FIG. 10 is a diagrammatic representation of the display panel of FIG. 7 that implements the example Gaussian scaling relationship of FIG. 8 and a resulting dimmed region that experiences less visual artifact relative to that shown in FIG. 9, in accordance with an embodiment of the present disclosure.

An infinitely derivable function may be used to step down the brightness without banding effects. To elaborate, FIGS. 8 and 10 describe generalized Gaussian scaling relationship-based brightness scaling that eliminates perceivable visual artifacts caused by other scaling relationships, like the trapezoidal brightness scaling relationship by FIG. 9. FIG. 8 is a diagrammatic representation of an example Gaussian scaling relationship and an example trapezoidal scaling relationship (e.g., linear scaling relationship) over N pixel rows of respective display panels 40 (display panel 40A, display panel 40B). FIG. 9 is a diagrammatic representation of the display panel 40A that implements the trapezoidal scaling relationship in FIG. 8 and has a dimmed region 92A that depicts a perceivable visual artifact 90. FIG. 10 is a diagrammatic representation of the display panel 40B of FIG. 8 that implements the example Gaussian scaling relationship of FIG. 8 and a resulting dimmed region 92B that does not depict the perceivable visual artifact 90. To aid description, FIGS. 8-10 are referred to together herein.

Plot 94 of FIG. 8 corresponds to N rows of a display panel 40 (e.g., x-axis) relative to an assigned brightness scaling percentage (%) (e.g., y-axis). Line 96 corresponds to the trapezoidal scaling relationship and line 98 corresponds to the Gaussian scaling relationship. The diagrammatic representation of the display panel 40A illustrates a visual artifact 90. This is, the visual artifact 90 shows the banding effect. The diagrammatic representation of the display panel 40B does not show the same banding effect. The Gaussian scaling relationship may cure these visual artifacts 90, as illustrated when comparing the dimmed region 92A to the dimmed region 92B in FIGS. 9 and 10.

Indeed, using the Gaussian scaling relationship to step down the brightness of a portion of the display 12 may improve brightness scaling of selective portions of the display 12 by eliminating perceivable banding effects. The Gaussian scaling relationship may involve image processing circuitry 28 adjusting a percentage used to scale image data for respective display pixels 54 or respective pixel rows, such that the respective differences between the display pixels 54 or rows are decreased according to a Gaussian curve.

Figure 11:
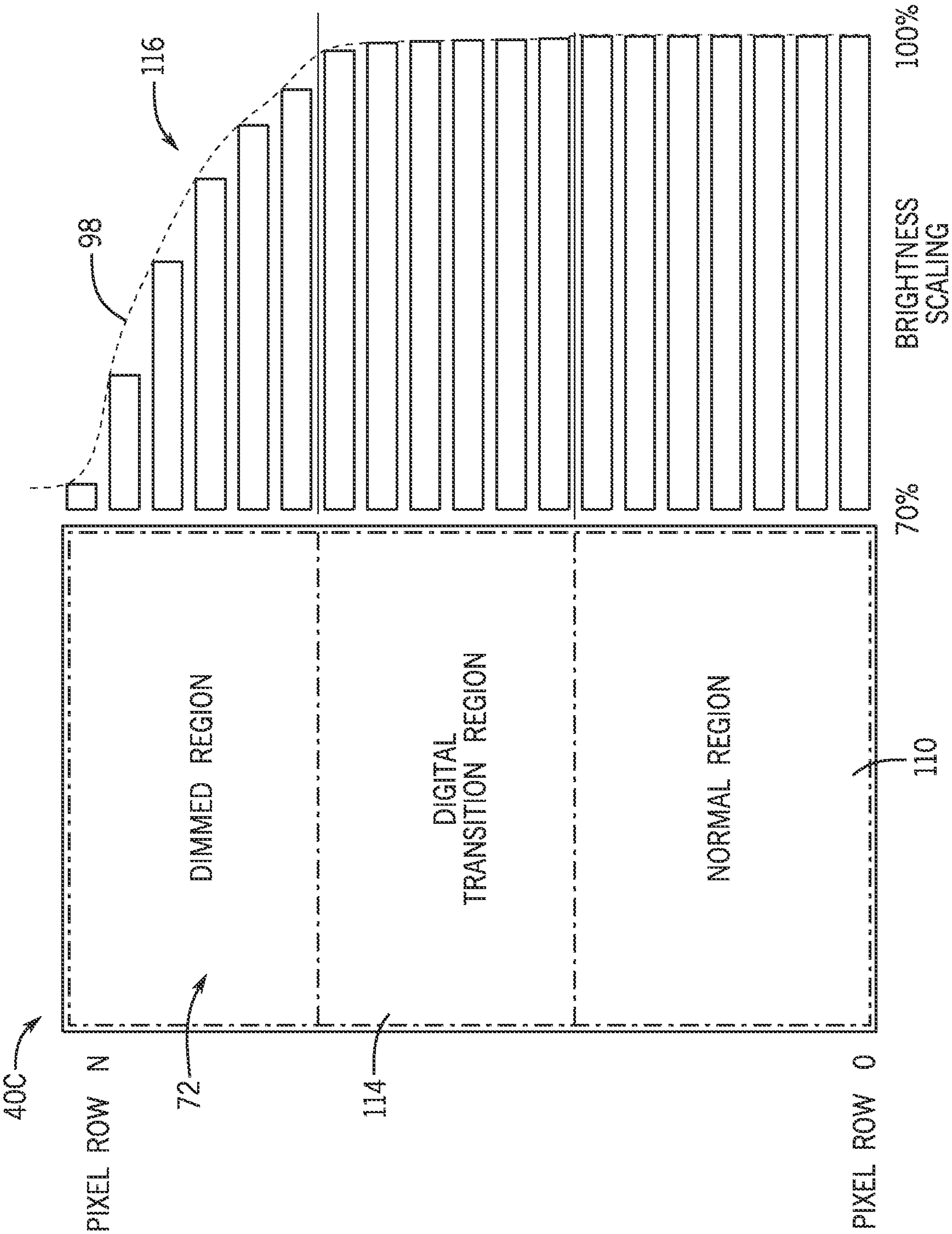
FIG. 11 is a diagrammatic representation of an example of a portion of the display panel of FIG. 6 implemented with multiple different panel regions and illustrated adjacent to an illustration of the Gaussian scaling relationship of FIGS. 8 and 10, in accordance with an embodiment of the present disclosure.

FIG. 11 is a diagrammatic representation of an example of a portion of the display panel 40 implemented with multiple different panel regions and illustrated adjacent to an illustration of the Gaussian scaling relationship 116 of FIGS. 8 and 10. The display panel 40 may include a dimmed region 72 (e.g., a 70% brightness panel section) and a normal region 110 (e.g., a 100% brightness panel section). Some systems may include an additional digital transition region 114 used to increase a number of display pixel rows the Gaussian scaling relationship 116 is applied over.

Pixel rows located within the normal region 110 may not be scaled based on the Gaussian scaling relationship 116 since these rows correspond to a 100% brightness scaling factor. Pixel rows located within the dimmed region 72 may be scaled based on the Gaussian scaling relationship 116. The pixel rows located within the dimmed region 72 may be scaled to N % of a maximum brightness value based on what scaling relationship is defined by the Gaussian scaling relationship 116. Line 98 is transposed on the Gaussian scaling relationship 116 to help illustrate how the scaling changes enabled by the Gaussian scaling relationship implements the Gaussian curve. The peak-to-peak changes in brightness between the various pixel rows (or, in some cases, pixels) may follow the Gaussian curve. In other words, the brightness of each portion of the display 12 is adjusted over time such that the adjustments follow the Gaussian curve.

As will be appreciated, the image processing circuitry 28 may receive first image data from an image source 38 and receive a brightness scaling gradient from memory 20 or other suitable storage, like storage devices 22 or controller memory 48. The image processing circuitry 28 may adjust the first image data based on the brightness scaling gradient, such as to non-linearly dim the brightness of the display 12 as approaching the dimmed portion 72 based on a Gaussian scaling relationship. The brightness scaling gradient may be non-uniform over the dimmed portion 72—for example, one region of the dimmed portion 72 may be scaled different from another region of the dimmed portion 72. In some cases, the image processing circuitry 28 may adjust the first image data based on an indication of current consumed by the display 12 (e.g., an indication of instantaneous average pixel brightness) to ensure that a power threshold of at least a portion of the display 12 is not exceeded. Once processed, the image processing circuitry 28 may output the adjusted first image data for presentation via the display panel 40. The image processing circuitry 28 may transmit the adjusted first image data based on any suitable output method used by the electronic device 10.

Figure 12A:
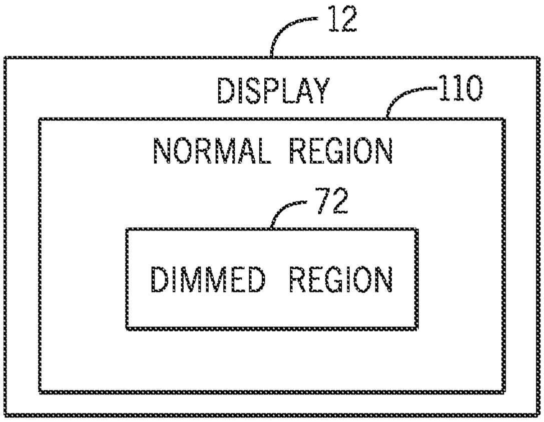
FIGS. 12A-12F are block diagrams of example displays of FIG. 1 (e.g., display panels of FIG. 6) with different dimmed regions in various configurations, in accordance with an embodiment of the present disclosure.
Figure 12B:
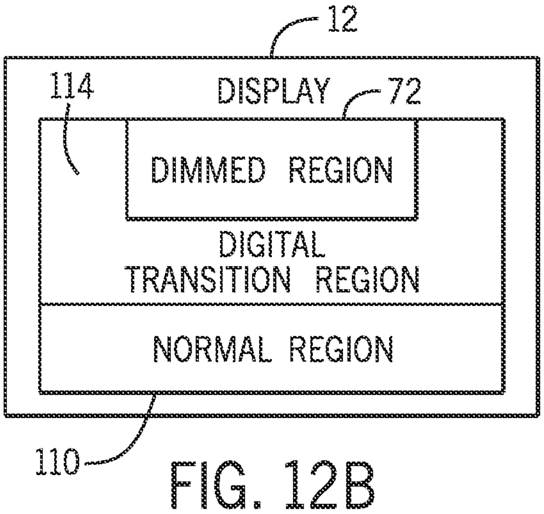
Figure 12C:
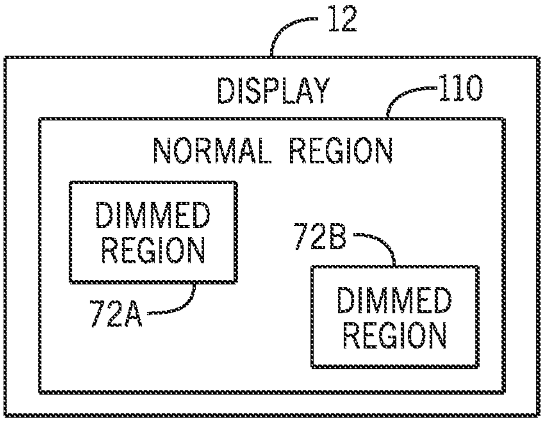
Figure 12D:
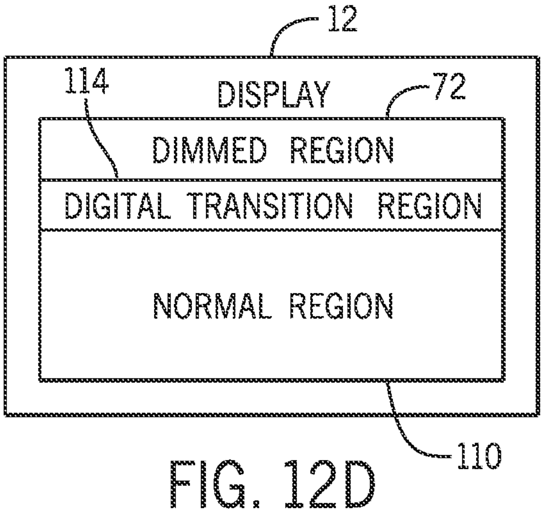
Figure 12E:
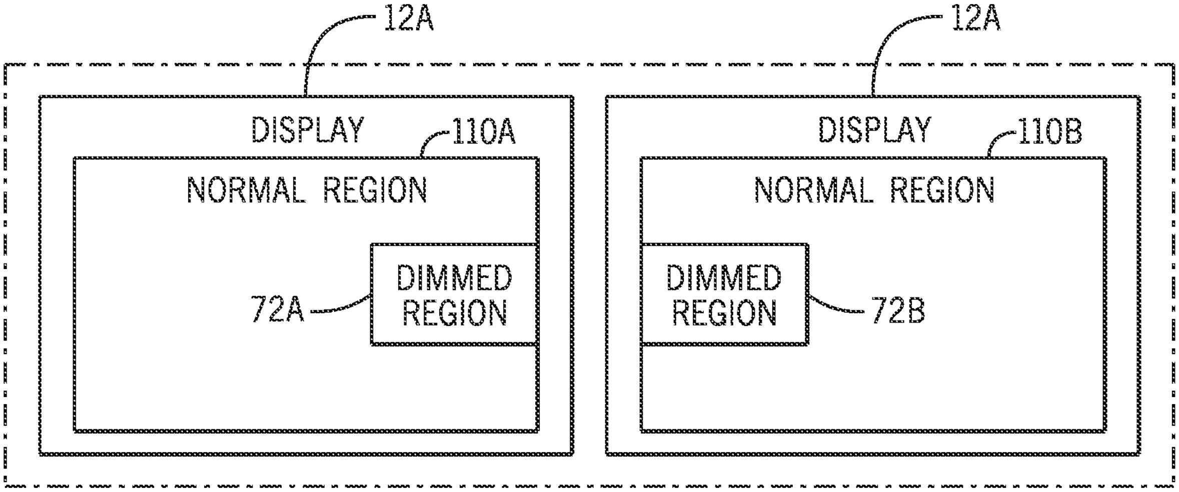
Figure 12F:
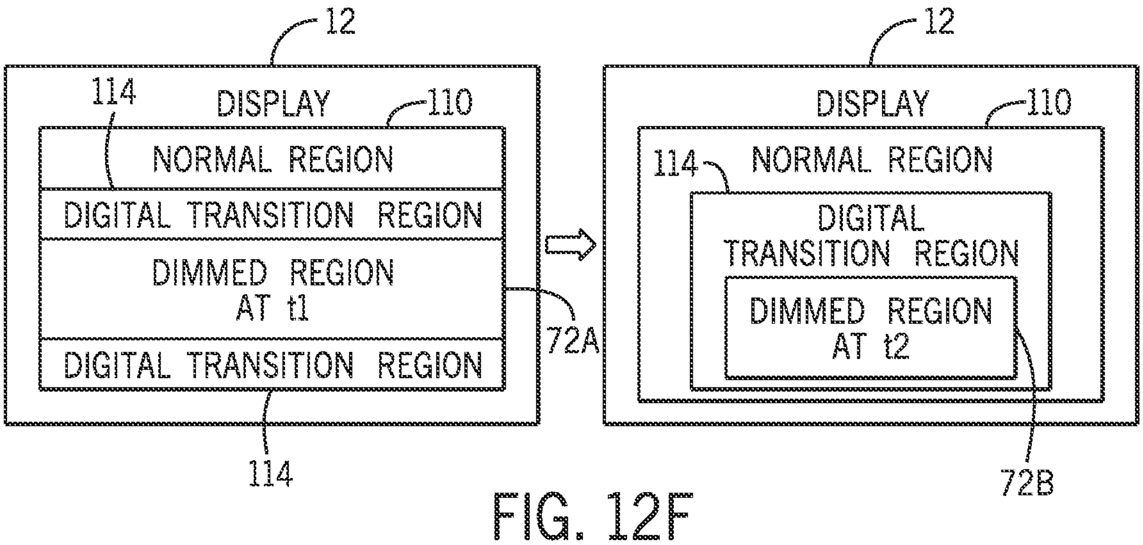

It is noted that in FIGS. 8-11 the dimmed region 92 is located near Row N. As will be appreciated, the dimmed region 92 may be in many various configurations. For example, FIGS. 12A-12E illustrate some of these example configurations. Indeed, FIGS. 12A-12F are block diagrams of example displays 12 (e.g., display panels 40) with different dimmed regions in various configurations. FIG. 12A corresponds to a display configuration where the normal region 110 surrounds each of the boundaries of the dimmed region 72. FIG. 12B corresponds to a display configuration where the normal region 110 shares a boundary with the digital transition region 114 and the digital transition region 114 surrounds the dimmed region 72 on a subset of boundaries. FIG. 12C corresponds to a display configuration where the normal region 110 shares boundaries with each of dimmed region 72A and the dimmed region 72B. There may the case where the dimmed regions 72 share a boundary but still are dimmed to different brightness levels. FIG. 12D corresponds to a display configuration where the normal region 110 shares a boundary with the dimmed region 72. The dimmed region 72 in this example spans a dimension (e.g., width) of the display panel 40. Another alternative here may be that the normal region 110 shares a boundary with the digital transition region 114 and the digital transition region 114 shares a boundary with the dimmed region 72. As yet another example, FIG. 12E corresponds to a display configuration spanning two or more displays. In this configuration, the normal regions 110A, 110B share a boundary with a subset of boundaries of the dimmed regions 72A, 72B, respectively. The example of FIG. 12E may correspond to displays where the output of the panels is coordinated across the multiple displays. In this way, the dimmed regions 72A, 72B may be dimmed to same or different brightness. In a final example, FIG. 12F shows a case where an input (e.g., tactile input) to the display panel 40 may cause a resizing of the dimmed region 72. Here, at a first time (t1), the dimmed region 72A has a first placement and size, and by a second time, the dimmed region has been resized and moved (e.g., transformed into) to a second dimmed region 72B. As the dimmed regions 72 are resized and/or moved, the Gaussian scaling relationship may move with the dimmed region 72. Furthermore, as the dimmed regions 72 are moved, one or more digital transition regions 114 may be moved with the dimmed region 72, such as to maintain the gradual brightness shift. Here, the digital transition regions 114 went from sharing two boundaries with the dimmed region 72 to sharing four boundaries. It is noted that FIGS. 12A-12F illustrate a subset of possible configurations and that a number of additional configurations are enabled and may benefit from the systems and methods described herein. Indeed, one or more of the dimmed regions 72 may be located at any place on the one or more display panels 40. Furthermore, the dimmed region 72 may take any shape, such as a hexagon, a circle, an oval, a triangle, or the like, based on a desired application. Furthermore, the dimmed region 72 may be the result of a relatively less dense usage of pixels relative to the normal region 110, which may include a normal, relatively high density of pixels.

Figure 13:
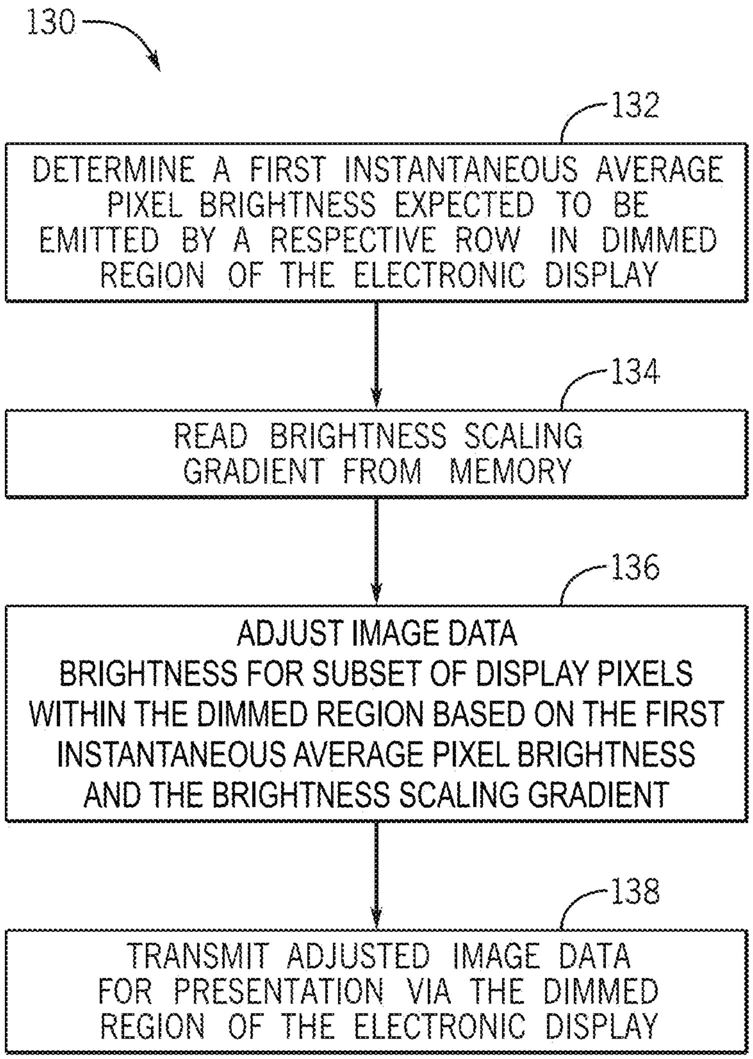
FIG. 13 is a flowchart of a method to perform brightness scaling based on the Gaussian scaling relationship of FIGS. 8 and 10, in accordance with an embodiment of the present disclosure.

One example of a method for performing brightness scaling based on a generalized Gaussian scaling relationship is shown by a flowchart 130 of FIG. 13. The method of the flowchart 130 may be performed by any suitable circuitry (e.g., one or more processing blocks of an application-specific integrated circuit (ASIC)) or instructions (e.g., software or firmware) running on processing circuitry (e.g., the processor core complex). For example, the flowchart 130 may be performed by the image processing circuitry 28 implemented as instructions running on the processor core complex 18 or as circuitry (e.g., one or more processing blocks of an application-specific integrated circuit (ASIC)), or both, and/or the image processing circuitry 28. It is noted that although described in a particular order herein, the method of the flowchart 130 may include additional steps and/or perform these recited operations in a different order than disclosed herein.

At block 132, the image processing circuitry 28 may determine a first instantaneous peak pixel brightness expected to be emitted by a respective row in the dimmed region 72 of the electronic display 12. To determine this, the image processing circuitry 28 may receive one or more indications of current expected to be consumed by one or more portions (e.g., rows) of the display panel 40. That is, the image processing circuitry 28 may receive image data from the image source 38 indicative of the current to be consumed by the display panel 40. The image data may include gray domain image data and/or voltage domain image data which the image processing circuitry may convert into indications of current based on voltage-current relationships of one or more of the display pixels 54. The indications of current may be used by the image processing circuitry to determine the first instantaneous average pixel brightness expected to be emitted by one or more rows of the electronic display 12.

At block 134, the image processing circuitry 28 may read a brightness scaling gradient from memory. The brightness scaling gradient may correspond to and implement a Gaussian scaling relationship 116. The adjustments indicated via the brightness scaling gradient to be applied to each, for example, row of display pixels 54 may result in an overall brightness change that follows the Gaussian pattern. The brightness scaling gradient may be stored as a lookup table in memory 20, where the lookup table may associate an adjustment to be applied to the image data (e.g., brightness scaling to be performed) to positions of display pixels within rows and/or columns of the display panel 40.

At block 136, the image processing circuitry 28 may adjust image data brightness for a subset of display pixels within the dimmed region based on the first instantaneous average pixel brightness and the Gaussian scaling relationship 116. That is, based on a relative location of the display pixel 54 within the display panel 40, image data corresponding to that display pixel 54 may be adjusted to implement a Gaussian curve via changes in brightness of the image data over the display panel 40. The Gaussian scaling may be performed for display pixels 54 in the same row of the display panel 40, for one or more display pixels 54 and different rows of the display panel 40, for different columns of the display panel 40, and/or for one or more display pixels 54 and different columns of the display panel 40. It is noted that any suitable combination of display pixels 54 on any suitable combination of rows and columns, non-contiguous or contiguous, may be adjusted by the Gaussian scaling relationship 116 to eliminate banding. Indeed, the dimmed region 72 may be a circle region, a triangular region, a rectangular region, or the like, and thus the processing may be applied accordingly.

To adjust the image data based on the Gaussian scaling relationship 116, the indicative of the relationship may be referenced. This way, the image processing circuitry 28 may determine where the display pixel 54 is located and then, based on not, identify the adjustment to be applied to the image data for that display pixel 54. Although described in terms of pixel level adjustments, regional adjustments may be made to the dimmed region 72. In this way, image data for each display pixel 54 may be adjusted, but a same adjustment may be applied to one or more display pixels 54 within the dimmed region 72. Peak brightness thresholds may be applied and/or considered during the regional adjustments made to the dimmed region 72. In some cases, one or more regions may receive different adjustments.

At block 138, the image processing circuitry 28 may transmit the adjusted image data for presentation via the dimmed region 72 of the electronic device 10. Processing the image data based on the Gaussian scaling relationship may prevent perceivable banding once the image data is presented.

Figure 14:
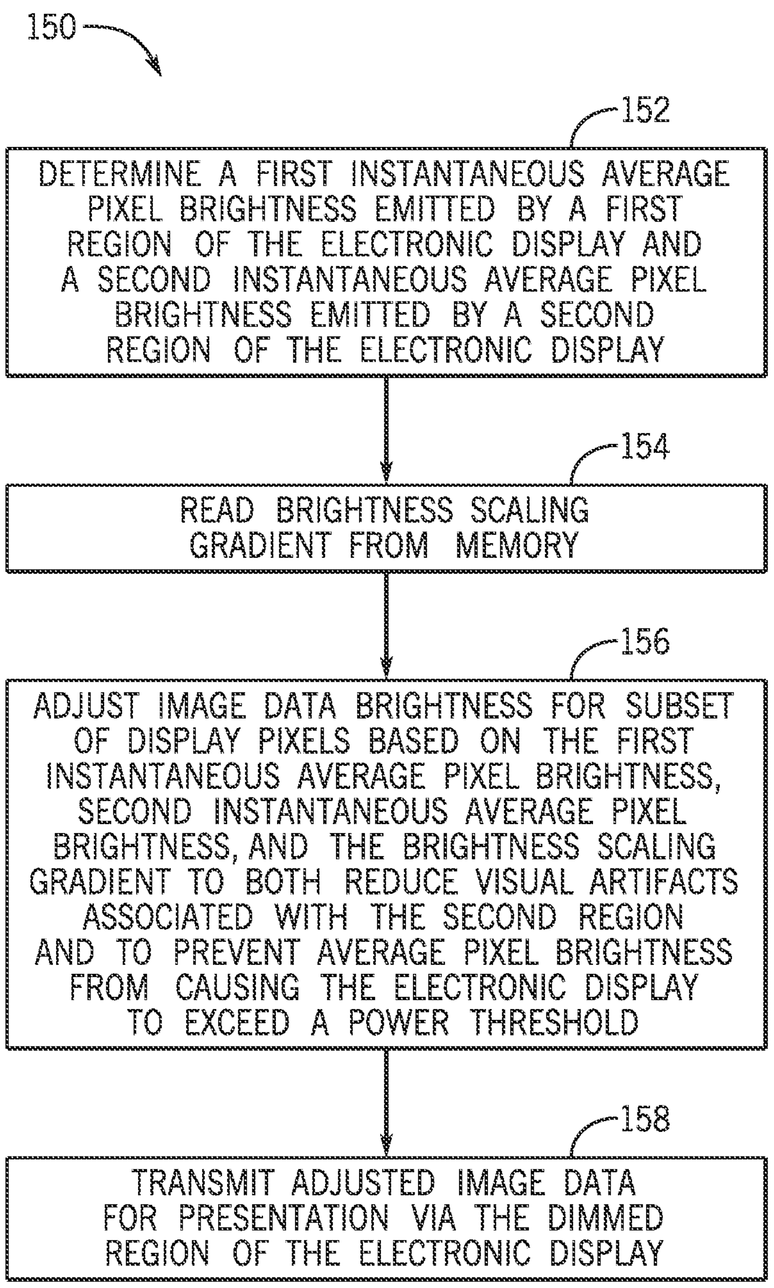
FIG. 14 is a flowchart of a method to perform brightness scaling based on the Gaussian scaling relationship of FIGS. 8 and 10 and based on instantaneous peak pixel brightness of one or more regions of the display panel of FIG. 7, in accordance with an embodiment of the present disclosure.

Another example of a method for performing brightness scaling based on a Gaussian scaling relationship is shown by a flowchart 150 of FIG. 14. The method of the flowchart 150 may be performed by any suitable circuitry (e.g., one or more processing blocks of an application-specific integrated circuit (ASIC)) or instructions (e.g., software or firmware) running on processing circuitry (e.g., the processor core complex). For example, the flowchart 150 may be performed by the image processing circuitry 28 implemented as instructions running on the processor core complex 18 or as circuitry (e.g., one or more processing blocks of an application-specific integrated circuit (ASIC)), or both. It is noted that although described in a particular order herein, the method of the flowchart 130 may include additional steps and/or perform these recited operations in a different order than disclosed herein.

At block 152, the image processing circuitry 28 may determine a first instantaneous average pixel brightness emitted by a first region of the electronic display 12 and a second instantaneous average pixel brightness emitted by a second region of the electronic display 12. The instantaneous average pixel brightness may quantify a power consumed by the display panel 40. To determine this, the image processing circuitry 28 may receive one or more indications of current consumed by one or more portions (e.g., rows) of the display panel 40, which may be processed to determine power consumed and/or the instantaneous average pixel brightness.

At block 154, the image processing circuitry 28 may read a brightness scaling gradient from memory. The brightness scaling gradient may be the Gaussian scaling relationship 116 described herein.

At block 156, the image processing circuitry 28 may adjust image data for a subset of display pixels 54 based on the first instantaneous operative pixel brightness, the second instantaneous average pixel brightness, and the brightness scaling gradient. This operation may both reduce visual artifacts associated with the second region and to prevent average pixel brightness from causing the electronic display to exceed a power threshold (e.g., power consumption threshold).

To elaborate, individual display pixels 54 of an electronic display 12 may collectively produce images by permitting different amounts of light to be emitted from each display pixel 54. The amount of light emitted by each self-emissive display pixel 54 may draw a different amount of electrical energy from the power supply 26. Display pixels 54 that are programmed to emit more light will draw more power than display pixels 54 programmed to emit less light. The total amount of light that can be emitted by the display pixels 54 at any one time may be limited by the total amount of power that can be supplied to the electronic display 12. Generally, light emission from a display pixel 54 varies with the amount of electrical energy stored therein. For example, in some instances, a display pixel 54 may include a light emissive element, such as an organic light-emitting diode (OLED), that varies its light emission with current flow therethrough, a current control switching device (e.g., transistor) coupled between the light emissive element and a pixel power (e.g., VDD) supply rail, and a storage capacitor coupled to a control (e.g., gate) terminal of the current control switching device. As such, varying the amount of energy stored in the storage capacitor may vary voltage applied to the control terminal of the current control switching device and, thus, magnitude of electrical current supplied from the pixel power supply rail to the light emissive element of the display pixel 54. Thus, by scaling brightness to change the amount of current supplied to respective display pixels 54, an overall amount of power consumed by the display panel 40 may be controlled (e.g., controlled to remain under a power consumption threshold).

Here, with block 156, the image processing circuitry 28 may adjust the brightness of the image data to prevent overconsumption of power as well as to prevent banding. Indeed, the image processing circuitry 28 may process a subset of the image data corresponding to the normal region 110 of the display panel 40 based on power consumption. The image processing circuitry 28 may process a subset of the image data corresponding to the dimmed region 72 of the display panel 40 based on power consumption and the Gaussian scaling relationship.

At block 158, the image processing circuitry 28 may transmit the adjusted image data for presentation via the dimmed region 72 of the electronic display 12. Processing the image data based on both power consumption and the Gaussian scaling relationship may prevent power overconsumption as well as perceivable banding once the image data is presented.

Figure 15:
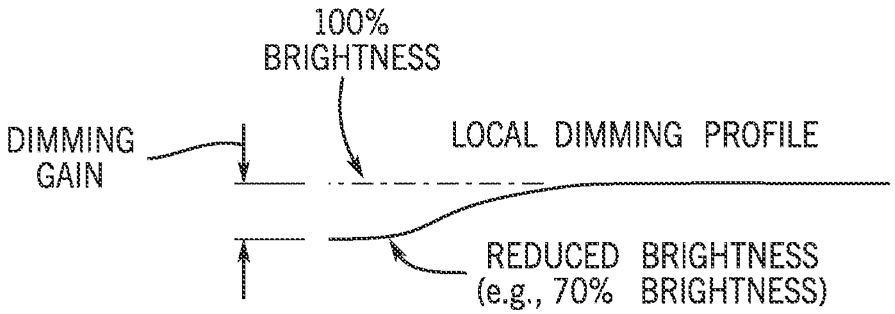
FIG. 15 is a diagrammatic representation of brightness scaling based on the Gaussian scaling relationship and a local brightness scaling gradient, in accordance with an embodiment of the present disclosure.
Figure 16:
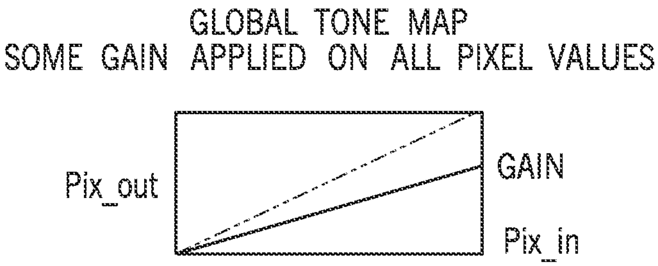
FIG. 16 is a diagrammatic representation of brightness scaling based on the Gaussian scaling relationship and a global tone map, in accordance with an embodiment of the present disclosure.
Figure 17:
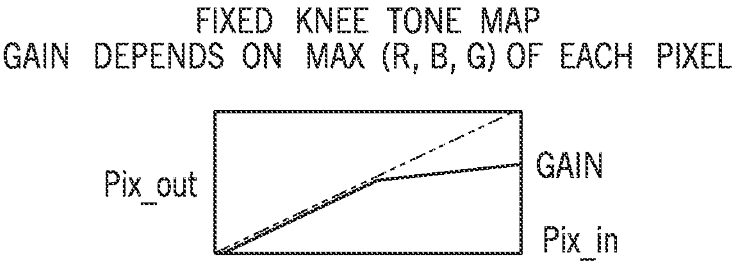
FIG. 17 is a diagrammatic representation of brightness scaling based on the Gaussian scaling relationship and a fixed knee tone map, in accordance with an embodiment of the present disclosure.

Additional examples of adjustments to the Gaussian scaling relationship 116 are shown in FIGS. 15-17 and described accordingly. There may be several ways to implement Gaussian scaling relationship 116. For example, dimmed region-aware global dimming, dimmed region-aware local dimming, current dependent local dimming of the dimmed region, current dependent local dimming based on a global tone map, and current dependent local dimming based on a fixed knee tone map are among examples described herein.

To elaborate on dimmed region-aware global dimming, the image processing circuitry 28 may change a global brightness based on image data (e.g., content) of the dimmed region 72 as well as current consumption. The image processing circuitry 28 may reduce brightness based on increases in current consumption and/or as content changes of the dimmed region 72. In some cases, the dimming profile slope may change as a function of current consumption changes, of content changes, or of both. One advantage of using this method may be that a viewer perceives a uniform relatively high brightness even when the dimmed region 72 content is dimmed.

To elaborate on dimmed region-aware local dimming, the image processing circuitry 28 may change the local brightness based on a local brightness scaling gradient. The local brightness scaling gradient may indicate changes to be implemented in the brightness values based on contents of the dimmed region 72 as well as current consumption of the dimmed region 72. This local brightness scaling gradient may change as current consumption increases or as the dimmed region 72 image content to be presented changes. In some cases, the dimming profile slope may change as a function of current consumption changes, of content changes, or of both. One advantage to this method may be that the active area 70 peak brightness may be set independent of that of the dimmed region 72.

To elaborate further on current dependent local dimming of the dimmed region, FIG. 15 is a diagrammatic representation of brightness scaling based on the Gaussian scaling relationship and a local brightness scaling gradient (e.g., a local dimming profile). The local brightness scaling gradient may depend on current consumption and may be calculated from dimming gain and a dimming profile. The dimming profile may be a predefined profile that associates respective scaling gains (e.g., dimming gain, scaling factor) to be applied to respective Y-positions (e.g., a respective display pixel row) in a lookup table. In some cases, the scaling values associated with the diming profile may be normalized relative to each other. The scaling gain may be determined based on brightness-current relationships for one or more display pixels 54. The local brightness scaling gradient may change when the current consumption increases or when the content changes of the dimmed region 72. Since based on current consumption, the local brightness scaling gradient may apply the Gaussian scaling relationship 116 per display pixel 54 or per region basis. When using the local brightness scaling gradient, the peak brightness of the active area 70 maybe independent of the brightness of the dimmed region 72. One benefit to using the local brightness scaling gradient may be that there is relatively less brightness modulation due to content changes. Additionally, peak pixel value tracking may not be required.

In some cases, the dimming profile is scaled based on a peak brightness value selected from among a current dataset of image data of a current image frame. The peak brightness value may be a maximum data value of the current image frame. In some cases, the peak brightness value corresponds to one or more maximum image data values associated with one or more pixels of one or more portions of the display panel 40 (e.g., a local maximum pixel value). In the event that a maximum pixel value (e.g., peak pixel value) is lower than a peak brightness threshold, the dimming profile may be scaled using a relatively smaller scaling value (as compared to scaling when greater than the threshold), such as a value closer to 1. Moreover, for high dynamic range (HDR) image content, pixels within a dimmed region 72 may have highlights reduced according to tone mapping based on a generalized gaussian edge profile and mid-tones and/or low gray values (e.g., image data closer to or a threshold value from 0) may be boosted to match a reference white value of the rest of the display. This white matching processing may effectively reduce a high dynamic range (HDR) headroom while maintaining a standard dynamic range (SDR) of the image content, which may reduce a likelihood of a user perceiving visual artifacts when viewing the dimmed region 72.

To perform the white matching, the image processing circuitry 28 may receive an image data set and determine a relatively lowest image data value from the portion of the image data set corresponding to the portion of the active area 70 outside of the dimmed region 72. Based on the lowest image data value, the image processing circuitry 28 may reduce one or more relatively lowest image data values from the portion of the image data set corresponding to the dimmed region 72 and/or the digital transition region 114 to equal the lowest image data value (e.g., white match the dimmed region 72 based on the lowest image data value). The image processing circuitry 28 may repeat the white matching process any number of times to blend the changes in white data values to match the white values of across the display panel 40. Image data greater than the threshold set by the relatively lowest image data value may be processed based on the generalized Gaussian edge profile to dim accordingly in the dimmed region 72 and/or the transition region 114. In some cases, there may be a range of data values across which the processing circuitry 28 repeats the white matching process. For example, a range of data values corresponding to the lowest X % of data values, like the lowest 10% of data values, are white matched by the image processing circuitry 28 across the various regions of the display panel 40.

Two options for current dependent local dimming include current dependent local dimming based on a global tone map (FIG. 16) and current dependent local dimming based on a fixed knee tone map (FIG. 17). FIG. 16 is a diagrammatic representation of brightness scaling based on the Gaussian scaling relationship and a global tone map. With a global tone map, a same or substantially similar gain may be applied to all display pixel 54 values within the dimmed region 72. This may have the advantage of resulting in a similar algorithm to implement the Gaussian scaling relationship as well as maintaining a local contrast that may be desirable.

FIG. 17 is a diagrammatic representation of brightness scaling based on the Gaussian scaling relationship and a fixed knee tone map. The fixed knee tone map may apply again based on a data value of the respective display pixels 54. In one case, the image processing circuitry 28 may analyze for a given display pixel 54 which of the red data, green data, or blue data is relatively higher and base the applied gain based on that greatest data value. This method may have the advantage of better maintaining uniformity or low gray (e.g., less bright, closer to gray level of 0) level content.

With the foregoing in mind, a display panel 40 is often implemented (e.g., disposed) along one or more external surfaces of an electronic device 10. For example, the display panel 40 may be implemented along a front-facing surface and/or a back-facing surface of the electronic device 10. The display panel 40 may be implemented along one or more side surface of the electronic device 10, such as a top-facing surface, a bottom-facing surface, a left-facing surface, a right-facing surface, or any combination thereof.

Since used to sense light, one or more optical sensors 42 are often implemented (e.g., disposed) along an external surface of an electronic device 10. An optical sensor 42 and a display panel 40 may be implemented along the same external surface of an electronic device 10. The optical sensor 42 and the display panel 40 may both be implemented along a front-facing surface of the electronic device 10. However, space in an electronic device 10—particularly along an external surface of the electronic device 10—is often limited. Thus, the optical sensor 42 may be disposed under or on a portion of the display panel 40 to facilitate reducing physical size (e.g., physical footprint) and thus, to improve portability of the electronic device 10.

To accommodate the optical sensor 42, the display panel 40 may be implemented with multiple panel sections that each have a different pixel resolution. For example, a display panel 40 may include a first panel section implemented with a lower pixel resolution (and thus is dimmer) (e.g., dimmed region 72) and a second panel section implemented with a higher pixel resolution (and thus is relatively brighter from density of pixels emitting light) (e.g., normal region 110). In some systems, the lower resolution panel section may be implemented with half the pixel resolution of the higher resolution panel section. The one or more optical sensors 42 may be implemented behind the low (e.g., lower and/or down sampled) resolution panel section. The Gaussian scaling relationship may be used to grade the change in brightness between the different portions of the display to improve a perceivable image quality of presented image frames.

Systems and methods described herein may utilize a Gaussian scaling relationship to better scale brightness of selective portions of the display in a manner that reduces or eliminates perceivable banding effects. The Gaussian scaling relationship may involve image processing circuitry adjusting a percentage used to scale image data for respective pixels or respective pixel rows, such that the respective differences between the pixels or rows are decreased according to a Gaussian curve. In this way, each pixel of an adjusted region may emit light at respective brightness levels to implement the Gaussian scaling relationship when being used to present image content (e.g., red-green-blue image content), and thus may be programmed to emit light according to different image data. The adjusted region may refer to a subset of pixels corresponding to a panel region that has had its brightness adjusted relative to one or more other subsets of pixels corresponding to one or more other panel regions. By non-linearly controlling changes in brightness of the display based on a Gaussian curve, a viewer may perceive a more uniform, linear dimming towards the relatively dimmer region without perceiving banding, leading to improved user experience with viewing the electronic display.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. An electronic device comprising:

a display panel configured to display an image, wherein the display panel comprises a first panel section and a second panel section, wherein the second panel section is configured to be dimmed relative to the first panel section, wherein the second panel section comprises a first density of pixels, wherein the first panel section comprises a second density of pixels, and wherein the second density of pixels is greater than the first density of pixels; and image processing circuitry communicatively coupled to the display panel and to an image source, wherein the image processing circuitry is configured to:

receive, from the image source, first image data corresponding to the second panel section and second image data corresponding to the first panel section;

read a brightness scaling gradient from memory;

adjust the first image data based on the brightness scaling gradient; and transmit the adjusted first image data and the second image data for presentation via the display panel.

2. The electronic device of claim 1, wherein the brightness scaling gradient comprises a non-uniform scaling relationship.

3. The electronic device of claim 1, wherein the brightness scaling gradient comprises a generalized Gaussian scaling relationship.

4. The electronic device of claim 1, wherein the second panel section spans a width of the display panel.

5. The electronic device of claim 4, wherein the second panel section shares a boundary with a transition region, and wherein the first panel section shares a boundary with the transition region.

6. The electronic device of claim 5, wherein the first image data is configured to be presented via a display pixel disposed within the transition region.

7. The electronic device of claim 1, wherein the first image data is configured to be presented via a display pixel disposed within the second panel section.

8. The electronic device of claim 1, wherein the image processing circuitry is configured to adjust the first image data based on a first instantaneous average pixel brightness corresponding to the first panel section, a second instantaneous average pixel brightness corresponding to the second panel section, and the brightness scaling gradient.

9. The electronic device of claim 8, wherein the first image data is adjusted based on the second instantaneous average pixel brightness to ensure that a peak brightness threshold of the second panel section is not exceeded.

10. A method comprising:

receiving first image data configured to be transmitted to a first pixel of a display panel, wherein the first image data corresponds to an image frame to be presented via the display panel;

reading a brightness scaling gradient from memory, wherein the brightness scaling gradient associates a location on the display panel of the first pixel to a scaling parameter to be applied to the first image data;

determining a first instantaneous peak pixel brightness associated with the first pixel;

adjusting the first image data based on the first instantaneous peak pixel brightness and the brightness scaling gradient; and transmitting the adjusted first image data to the first pixel.

11. The method of claim 10, wherein reading the brightness scaling gradient from the memory comprises reading the brightness scaling gradient that implements a non-linear brightness scaling via a plurality of scaling parameters including the scaling parameter.

12. The method of claim 10, wherein reading the brightness scaling gradient from the memory comprises reading the brightness scaling gradient that implements a generalized Gaussian brightness scaling via a plurality of scaling parameters including the scaling parameter.

13. The method of claim 10, wherein the display panel corresponds to a virtual-reality headset.

14. The method of claim 10, wherein the display panel corresponds to a mixed-reality headset.

15. The method of claim 10, wherein the display panel corresponds to a vehicle dashboard.

16. A system, comprising:

a display panel configured to present an image frame via a first panel section of first pixels and a second panel section of second pixels, wherein the first pixels are configured to emit light at a first brightness level, wherein the second pixels are configured to emit light at a second brightness level, wherein the second brightness level is less than the first brightness level, and wherein the second panel section is configured to change dimensions in response to an input received via the display panel; and image processing circuitry communicatively coupled to the display panel and to an image source, wherein the image processing circuitry is configured to respectively scale image data based on respective locations of each pixel of the second pixels within the display panel to implement a non-linear brightness scaling gradient.

17. The system of claim 16, wherein the non-linear brightness scaling gradient comprises a generalized Gaussian scaling gradient.

18. The system of claim 16, wherein the image processing circuitry is configured to update how the non-linear brightness scaling gradient is applied based on the changed dimensions of the second panel section.

19. The system of claim 16, wherein the non-linear brightness scaling gradient corresponds to a current-dependent brightness scaling gradient, and wherein image data corresponding to the second panel section is scaled based on an expected current output associated with the second panel section.

20. The system of claim 19, wherein the non-linear brightness scaling gradient comprises an indication of a gain to be applied to the image data to scale the image data, and wherein the gain to be applied to a respective pixel is determined based on sub-pixel data values of that pixel.

* * * * *